(12) United States Patent
Persson et al.

(10) Patent No.: US 9,384,084 B2
(45) Date of Patent: Jul. 5, 2016

(54) COMPLETE AND COMPATIBLE FUNCTION

(75) Inventors: Magnus Persson, Mygennaes (SE);
Thomas Johansson, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 139 days.

(21) Appl. No.: 13/428,876

(22) Filed: Mar. 23, 2012

(65) Prior Publication Data

US 2012/0246615 A1 Sep. 27, 2012

(30) Foreign Application Priority Data

Mar. 23, 2011 (EP) .................................... 11159334

(51) Int. Cl.
  G06F 9/44 (2006.01)
  G06F 9/00 (2006.01)
  G06F 21/00 (2013.01)
  G06F 11/10 (2006.01)

(52) U.S. Cl.
  CPC .......... *G06F 11/1004* (2013.01); *G06F 9/4411* (2013.01); *G06F 9/44* (2013.01)

(58) Field of Classification Search
  None
  See application file for complete search history.

(56) References Cited

U.S. PATENT DOCUMENTS

| | | | | |
|---|---|---|---|---|
| 5,579,509 A * | 11/1996 | Furtney et al. | ................. | 703/27 |
| 6,167,338 A * | 12/2000 | De Wille et al. | ................. | 701/51 |
| 6,640,334 B1 * | 10/2003 | Rasmussen | ................. | 717/171 |
| 7,275,184 B2 * | 9/2007 | Wolff et al. | ................. | 714/39 |
| 8,423,967 B2 * | 4/2013 | Holden et al. | ................. | 717/127 |
| 8,484,752 B2 * | 7/2013 | Traenkenschuh et al. | ...... | 726/30 |
| 2003/0056107 A1 * | 3/2003 | Cammack et al. | ............ | 713/189 |
| 2003/0167407 A1 * | 9/2003 | Howard | ................. | 713/201 |
| 2004/0025011 A1 * | 2/2004 | Azema et al. | ................. | 713/156 |
| 2004/0025027 A1 * | 2/2004 | Balard et al. | ................. | 713/183 |
| 2005/0033493 A1 * | 2/2005 | Eguchi et al. | ................. | 701/36 |
| 2005/0085967 A1 * | 4/2005 | Mitsueda et al. | ............... | 701/36 |
| 2005/0262337 A1 | 11/2005 | Ziesmer | | |
| 2006/0090158 A1 * | 4/2006 | Ogo et al. | ................. | 717/168 |
| 2007/0079112 A1 * | 4/2007 | Lewis et al. | ................. | 713/2 |
| 2008/0137848 A1 * | 6/2008 | Kocher et al. | ................. | 380/201 |
| 2009/0126028 A1 * | 5/2009 | Traenkenschuh et al. | ...... | 726/30 |
| 2010/0042824 A1 * | 2/2010 | Lee et al. | ................. | 713/2 |

FOREIGN PATENT DOCUMENTS

| | | | |
|---|---|---|---|
| EP | 0973092 A2 | 1/2000 | |
| EP | 1647885 A2 | 4/2006 | |

* cited by examiner

*Primary Examiner* — Li B Zhen
*Assistant Examiner* — Mohammad Kabir
(74) *Attorney, Agent, or Firm* — Brooks Kushman P.C.

(57) ABSTRACT

An arrangement for verifying the completeness and compatibility of software components in an electronic control unit includes a bootloader and a CompleteCompatible verification component. The bootloader is arranged to, upon start-up of the electronic control unit, verify the completeness and compatibility of the CompleteCompatible verification component, and upon such verification being positive initiate the CompleteCompatible verification component. The CompleteCompatible verification component is arranged to, upon performance thereof, verify the completeness and compatibility of further software components in the electronic control unit.

7 Claims, 1 Drawing Sheet

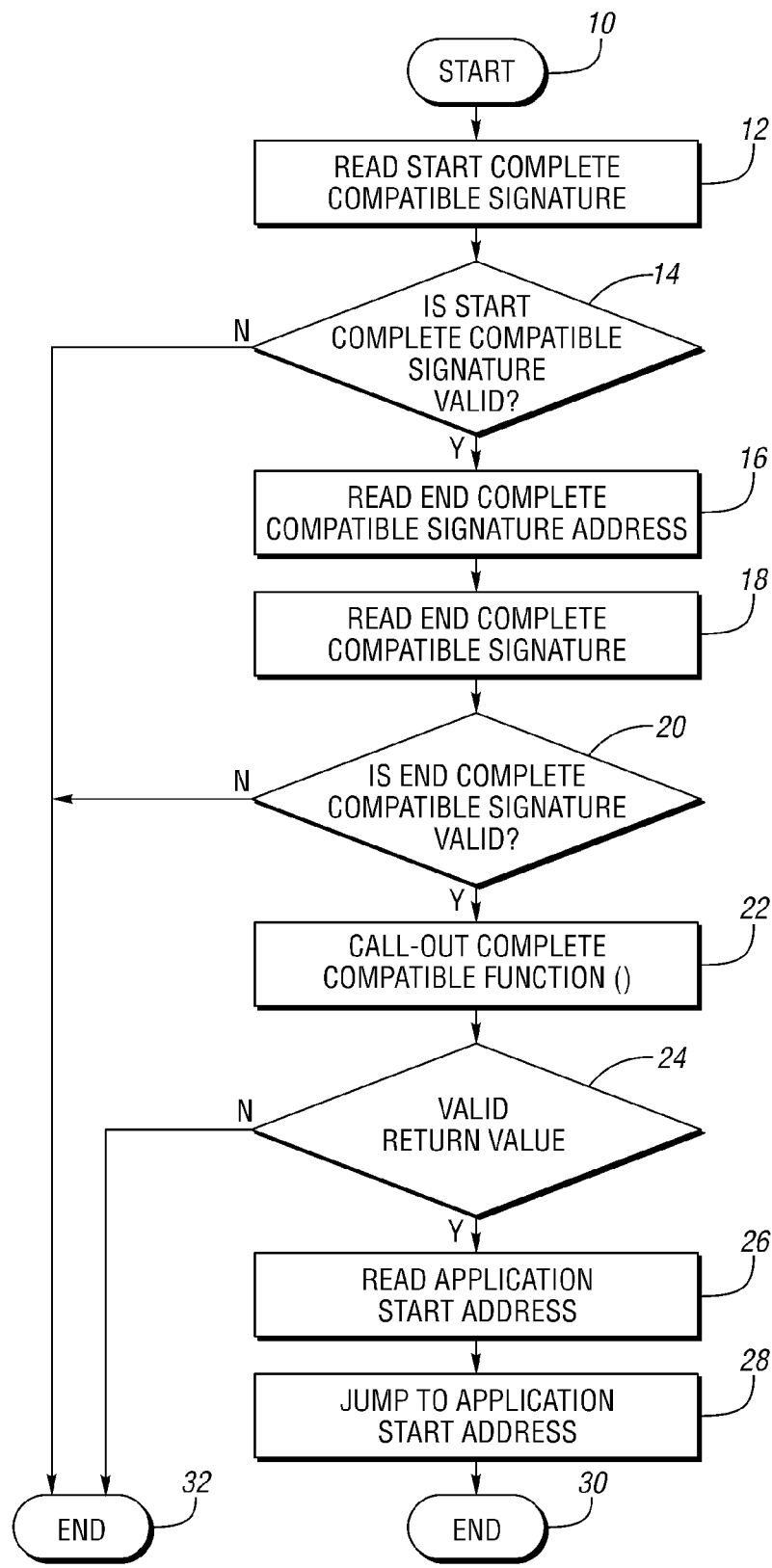

COMPLETE AND COMPATIBLE FUNCTION

CROSS-REFERENCE TO RELATED APPLICATIONS

This application claims foreign priority benefits under 35 U.S.C. §119(a)-(d) to EP 11159334.9, filed Mar. 23, 2011, the disclosure of which is hereby incorporated by reference in its entirety.

TECHNICAL FIELD

The present application relates to an arrangement for verifying the completeness and compatibility of software components in an electronic control unit.

BACKGROUND OF THE INVENTION

When downloading software to an Electronic Control Unit (ECU) of a vehicle there is a risk that something goes wrong. Should something go wrong there is further a risk that the total amount of ECU software may not be complete or potentially different parts of the software not compatible with each other. This may e.g. be the result of an aborted programming event, leaving the ECU only partially programmed.

Should the software of the ECU not be complete or components thereof not compatible, this may have as a result that the ECU is unable to communicate properly to initiate a new programming event.

In some of today's software download concepts there is only a simple detection whether an application is valid or not. This detection does not include the total amount of software of the ECU, neither does this detection include any check that different parts of the software stored in the ECU are compatible with each other.

An obvious safeguard would be to have a bootloader of the ECU perform a check that the software components of the ECU are complete and compatible with each other at every start-up.

However, as the bootloader of the ECU normally will be fix and burnt into a memory circuit of the ECU, it is normally not possible to change the bootloader without replacing the hardware of the ECU. Thus the number of software components to check for completeness and compatibility will be fix unless the ECU is replaced. However, it is not feasible to replace the ECU every time there is a need to include an additional software component.

Thus, there is a need for introducing a more controlled start-up of an application for verifying if the software components of the ECU are complete and compatible with each other.

SUMMARY OF THE INVENTION

One object of the application is to provide an improved arrangement for verifying the completeness and compatibility of software components in an electronic control unit.

This object is achieved by means of an arrangement for verifying the completeness and compatibility of software components in an electronic control unit.

Thanks to the provision of a bootloader and a CompleteCompatible verification component, where the bootloader is arranged to, upon start-up of the electronic control unit, verify the completeness and compatibility of the CompleteCompatible verification component, and upon such verification being positive initiate the CompleteCompatible verification component, where the CompleteCompatible verification component is arranged to, upon performance thereof, verify the completeness and compatibility of further software components in the electronic control unit is provided an arrangement which allows for downloading and updating the software of an ECU with revised or even additional software components, whilst retaining the same bootloader, same ECU unit.

A further object of the application is to provide an improved method for verifying the completeness and compatibility of software components in an electronic control unit.

This object is achieved by means of a method for verifying the completeness and compatibility of software components in an electronic control unit.

Thanks to the provision of the steps of: verifying, upon start-up of the electronic control unit, the completeness and compatibility of the CompleteCompatible verification component, and upon such verification being positive executing the CompleteCompatible verification component for verifying the completeness and compatibility of further software components in the electronic control unit is provided a method which allows for downloading and updating the software of an ECU with revised or even additional software components, whilst retaining the same bootloader, same ECU unit.

DESCRIPTION OF DRAWINGS

In the following, the invention will be described in greater detail by way of example only with reference to attached drawings, in which The FIGURE is a schematic sequence diagram illustrating the method for verifying the completeness and compatibility of software components in an electronic control unit in accordance with an embodiment of the present invention.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

In overview, the present application relates to an arrangement for verifying the completeness and compatibility of software components in an electronic control unit (ECU), and in particular an ECU of an automotive vehicle. The arrangement comprises a bootloader and a CompleteCompatible verification component.

The proposed solution is to introduce a verification functionality which is distributed between the bootloader and a CompleteCompatible verification component, which may be a software component or a downloaded list of indirect instructions, through which the ECU can determine if it is capable of starting with full operational functionality or not. This component, hereinafter referred to as the CompleteCompatible verification component, is responsible for checking that the total amount of the ECU further software components are complete and that the components thereof are compatible with each other.

Verification is suitably not performed by the bootloader alone, as the bootloader normally is fixed and burnt to a memory circuit of the ECU and therefore not easily changed.

The proposed solution, to introduce a verification functionality which is distributed as described above, allows for downloading and updating the software of the ECU with revised or even additional software components, whilst retaining the same bootloader, same ECU unit. It should be the responsibility of each respective application developer to ensure that this functionality is implemented in all revised or additional software components.

The bootloader is arranged to, upon start-up of the electronic control unit, verify the completeness and compatibility of the CompleteCompatible verification component. Upon such verification being positive the CompleteCompatible verification component is initiated. Verification is made each time the ECU is started.

Thus, the bootloader of the ECU shall at every start-up check if the software components of the ECU are complete and compatible with each other before starting to execute the software application.

The CompleteCompatible verification component is arranged to, upon performance thereof, verify the completeness and compatibility of further software components in the electronic control unit. The CompleteCompatible verification component is thus required to detect if any part of the software is missing or broken, e.g. that data is only partly downloaded. The CompleteCompatible verification component is also responsible for deciding whether the stored software parts are compatible with each other.

The bootloader thus initially initiates the CompleteCompatible verification component which initially checks itself and thereafter all the other software components of the ECU.

In order to avoid updates of the bootloader if e.g. a start address of the software application or the CompleteCompatible verification component is changed there should be defined memory locations where the bootloader shall read the information from.

The dependency between the bootloader and the software application of the ECU is thus the memory address where the CompleteCompatible verification component is started from.

The CompleteCompatible verification component may further be arranged to return a value to the bootloader indicative of whether all software components in the electronic control unit are complete and compatible. If the returned value indicates that all software components in the electronic control unit are complete and compatible, then the electronic control unit may be started with full operational functionality. Thus, if the CompleteCompatible verification component returns the correct value to the bootloader, it will start executing the software of the ECU.

The CompleteCompatible verification component could e.g. be initiated from the bootloader via a routineidentifier or during an Init phase via a call-out. The time for performing the CompleteCompatible verification should be limited. If the bootloader has not received a response value within this time the bootloader should treat this as an indication that the software components are incomplete or incompatible.

The bootloader may further be arranged to verify the completeness and compatibility of the CompleteCompatible verification component through reading a StartCompleteCompatibleSignature and an EndCompleteCompatibleSignature from predetermined memory addresses in an associated memory. Presence of both a StartCompleteCompatibleSignature and an EndCompleteCompatibleSignature are required for positive verification. The only dependency between the bootloader and the software components is the complete and compatible block structure, StartCompleteCompatibleSignature and EndCompleteCompatibleSignature.

The StartCompleteCompatibleSignature should be a defined signature value that is known by the bootloader. The bootloader shall know the memory address where the StartCompleteCompatibleSignature is located. A possible value for the StartCompleteCompatibleSignature is 0x5374617274536967 (StartSig in ASCII). A value of 0xFFFFFFFFFFFFFFFF should not be allowed. A possible value for the EndCompleteCompatibleSignature is 0x456e645369676e61 (EndSigna in ASCII). A value of 0xFFFFFFFFFFFFFFFF should not be allowed.

The CompleteCompatible verification component may further be arranged to verify the completeness of the further software components through checking that a respective start and stop address for each further software component is correct. Thus, as a minimum the CompleteCompatible verification component checks that the start and stop address of each further software component is correct, in order to establish if the entire component is there.

The CompleteCompatible verification component may further be arranged to verify the compatibility of the further software components through checking that a version number for each further software component is correct. By checking the version numbers it is possible to verify e.g. that the all further software components have been created using the same specification.

Alternatively the CompleteCompatible verification component may further be arranged to verify the compatibility of the further software components using a routineIdentifier, relying on RoutineControl request messages and responses thereto.

The CompleteCompatible verification component may further be arranged to verify the completeness and compatibility of the further software components through calculating a checksum for each respective further software component and comparing this checksum with a reference value stored in the associated memory. This checksum calculation will have to be performed very rapidly as the ECU normally is expected to start-up within 20 to 25 ms.

The CompleteCompatible verification component may, upon verification that the further software components are complete and compatible, further be arranged to read an application start address from the associated memory and jump to the application start address for execution of the further software components in the electronic control unit.

The present application also relates to an electronic control unit for a motor vehicle, comprising an arrangement for verifying the completeness and compatibility of software components in an electronic control unit as described above.

The present application also relates to a method for verifying the completeness and compatibility of software components in an electronic control unit. The method comprises the steps of: verifying, upon start-up of the electronic control unit, the completeness and compatibility of the CompleteCompatible verification component, and upon such verification being positive initiating the CompleteCompatible verification component for verifying the completeness and compatibility of further software components in the electronic control unit.

The method may further comprise the step of returning a value indicative of whether all software components in the electronic control unit are complete and compatible.

The method may still further comprises the step of verifying the completeness and compatibility of the CompleteCompatible verification component through reading a StartCompleteCompatibleSignature and an EndCompleteCompatibleSignature from predetermined memory addresses in an associated memory, where the presence of both are required for positive verification.

The method may yet further comprise the step of verifying the completeness of the further software components through checking that a respective start and stop address for each further software component is correct.

Still further, the method may comprise the step of verifying the compatibility of the further software components through checking that a version number for each further software component is correct.

Yet further, the method may comprise the step of verifying the completeness and compatibility of the further software components through calculating a checksum for each respective further software component and comparing this checksum with a reference value stored in the associated memory.

Finally, the method may comprise the steps of, upon verification that the further software components are complete and compatible, reading an application start address from an associated memory and jumping to the application start address for execution of the further software components in the electronic control unit.

The FIGURE is a schematic sequence diagram illustrating the method for verifying the completeness and compatibility of software components in an electronic control unit in accordance with an embodiment of the present invention. The flow may be described as follows:

Start-up of the ECU is initiated whereupon the bootloader reads a StartCompleteCompatibleSignature (blocks 10, 12).

Thereafter a check it the StartCompleteCompatibleSignature is valid is performed (block 14). If found that the StartCompleteCompatibleSignature is not valid the flow is ended (block 32).

If found that the StartCompleteCompatibleSignature is valid the bootloader reads an EndCompleteCompatibleSignatureAdress (block 16).

Once the EndCompleteCompatibleSignatureAdress has been acquired the EndCompleteCompatibleSignature is read by the bootloader (block 18).

Thereafter a check if the EndCompleteCompatibleSignature is valid is performed (block 20). If found that the EndCompleteCompatibleSignature is not valid the flow is ended (block 32).

If found that the EndCompleteCompatibleSignature is valid the CompleteCompatibleFunction( ) is called out, i.e. the CompleteCompatible verification component is initiated and a value is returned to the bootloader indicative of whether all software components in the electronic control unit are complete and compatible (block 22).

If the thus returned value indicates that any component of the software is incomplete or incompatible the flow is ended (blocks 24, 32).

Otherwise, i.e. if the thus returned value indicates that all components of the software are complete and compatible an ApplicationStartAdress for executing the further software components of the ECU is read (block 26).

Finally, a jump to the thus read ApplicationStartAdress is performed and the further software components of the ECU are executed (blocks 28, 30).

If the CompleteCompatible verification component is a downloaded list of indirect instructions, this list may be considered a table of control data such as: the value YY should be found at address XX; between addresses XX and YY the checksum should be ZZ; or addresses XX and YY should have the same value.

All of this is easily integrated in a downloadable table, e.g. one byte for each type of operation, one or two addresses, expected result, errorcode if the test fails, and repeat this for all tests which are relevant to perform. Thus a configurable control may be achieved.

One solution for verifying if something is programmed is to add a start and stop signature as described above. An less complete alternative is to just verify that the memory is not empty/erased. A more ambitious alternative is to verify a checksum from start to stop for each block.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for verifying the completeness and compatibility of software components, the arrangement comprising:
an electronic control unit (ECU) having memory comprising a memory circuit;
a bootloader stored in the memory circuit; and
a CompleteCompatible verification component stored in the memory,
where the bootloader is arranged to, upon start-up of the ECU, verify the completeness and compatibility of the CompleteCompatible verification component;
wherein, to verify the completeness and compatibility of the CompleteCompatible verification component, the bootloader is arranged to
read a StartCompleteCompatibleSignature;
check if the StartCompleteCompatibleSignature is valid;
if the StartCompleteCompatibleSignature is found valid, read an EndCompleteCompatibleSignatureAddress;
read an EndCompleteCompatibleSignature; and
check if the EndCompleteCompatibleSignature is valid, and upon such verification being positive initiate the CompleteCompatible verification component,
where the CompleteCompatible verification component is arranged to, upon performance thereof, check that a respective start and stop address as well as a version number for a further software component in the ECU is correct or calculate a checksum for the further software component and compare the calculated checksum with a reference value stored in associated memory in order to verify the completeness and compatibility of the further software component in the ECU before the further software component exercises control of the ECU;
wherein the bootloader is arranged for verification of the CompleteCompatible verification component, and the CompleteCompatible verification component is arranged for verification of the further software component in the ECU without involvement of the bootloader in the verification of the further software component.

2. The arrangement according to claim 1 wherein the CompleteCompatible verification component further is arranged to return a value to the bootloader indicative of whether all software components in the electronic control unit are complete and compatible such that the electronic control unit may be started with full operational functionality or not.

3. The arrangement according to claim 1 wherein the CompleteCompatible verification component, upon verification that the further software components are complete and compatible, is arranged to read an application start address from the associated memory and jump to the application start address for execution of the further software components in the electronic control unit.

4. An electronic control unit (ECU) for a motor vehicle, the ECU comprising:
   memory comprising a memory circuit; and
   an arrangement for verifying the completeness and compatibility of software components in the ECU, the arrangement including a bootloader stored in the memory circuit and a CompleteCompatible verification component stored in the memory,
   where the bootloader is arranged to, upon start-up of the electronic control unit, verify the completeness and compatibility of the CompleteCompatible verification component
   wherein, to verify the completeness and compatibility of the CompleteCompatible verification component, the bootloader is arranged to
      read a StartCompleteCompatibleSignature;
      check if the StartCompleteCompatibleSignature is valid;
      if the StartCompleteCompatibleSignature is found valid, read an EndCompleteCompatibleSignatureAddress;
      read an EndCompleteCompatibleSignature; and
      check if the EndCompleteCompatibleSignature is valid, and upon such verification being positive initiate the CompleteCompatible verification component,
   where the CompleteCompatible verification component is arranged to, upon performance thereof, check that a respective start and stop address as well as a version number for a further software component in the ECU is correct or calculate a checksum for the further software component and compare the calculated checksum with a reference value stored in associated memory in order to verify the completeness and compatibility of the further software components in the ECU before the further software component exercises control of the ECU;
   wherein the bootloader is arranged for verification of the CompleteCompatible verification component, and the CompleteCompatible verification component is arranged for verification of the further software component in the ECU without involvement of the bootloader in the verification of the further software component.

5. A method for verifying the completeness and compatibility of software components in an electronic control unit (ECU), the method comprising:
   verifying, via a bootloader upon start-up of the ECU, the completeness and compatibility of a CompleteCompatible verification component through
      reading a StartCompleteCompatibleSignature;
      checking if the StartCompleteCompatibleSignature is valid;
      if the StartCompleteCompatibleSignature is found valid, reading an EndCompleteCompatibleSignatureAddress;
      reading an EndCompleteCompatibleSignature; and
      checking if the EndCompleteCompatibleSignature is valid, and
   upon such verification being positive initiating the CompleteCompatible verification component for verifying the completeness and compatibility of a further software component in the ECU, before the further software component exercises control of the ECU, through at least one of
      checking that a respective start and stop address as well as a version number for each further software component is correct;
      calculating a checksum for each respective further software component and comparing the calculated checksum with a reference value stored in associated memory;
   wherein the bootloader is arranged for verification of the CompleteCompatible verification component, and the CompleteCompatible verification component is arranged for verification of the further software component in the ECU without involvement of the bootloader in the verification of the further software component.

6. The method according to claim 5 further comprising:
   returning a value indicative of whether all software components in the electronic control unit are complete and compatible.

7. The method according to claim 5 further comprising:
   upon verification that the further software components are complete and compatible, reading an application start address from an associated memory and jumping to the application start address for execution of the further software components in the electronic control unit.

* * * * *